Oct. 15, 1974     C. R. FORLER ET AL     3,841,932

METHOD AND APPARATUS FOR REPAIRING CRACKS IN WINDSHIELDS

Filed April 16, 1973

United States Patent Office 3,841,932
Patented Oct. 15, 1974

3,841,932
METHOD AND APPARATUS FOR REPAIRING CRACKS IN WINDSHIELDS
C. Richard Forler, 7642 S. Ames Way, Littleton, Colo. 80123, and Conrad F. Heins, 1310 S. Race St., Denver, Colo. 80210
Filed Apr. 16, 1973, Ser. No. 351,540
Int. Cl. B32b 35/00
U.S. Cl. 156—94　　　　　　　　　　　　　　　8 Claims

ABSTRACT OF THE DISCLOSURE

A method of repairing, in situ, a generally conical crack in the outer panel or pane of a conventional shatter resistant windshield having a central plastic lamination at which the base of the crack terminates, which comprises, erecting a dam around the crack, filling the dam with a transparent liquid, and applying force to the apex of the cone in a direction normal to the pane and in gyratory direction about the cone axis to gyrate the cone and widen the crack progressively around its circumference to thereby permit the liquid to enter same and displace the air therein. The preferred liquid is polymerizable in the presence of actinic radiation. In an alternative form it may be non-polymerizable, such as an oil, and sealed against bleeding from the crack by a quick setting transparent epoxy resin applied to the small indentation at the apex of the cone.

BACKGROUND OF THE INVENTION

As is well known, laminated shatter resistant automotive windshields are sometimes damaged by impact of a small hard object, producing a generally conical crack, the base of which terminates at the central plastic lamination. The indentation at the apex of the cone is usually quite small but the diameter of the base of the cone may be of the order of 15–20 mm. Also, small cracks may be present which extend outwardly from the conical crack. The locus of the damage appears dark due to the large difference between the index of refraction of glass and the air within the crack. In some locations it is illegal to operate a vehicle with such damage if it is in a position where it interferes with the road vision of the vehicle operator. Since the cost or replacement of such type windshield is considerable, it has long been recognized that some type of repair is highly desirable. A well known form of temporary repair comprises application of a transparent low viscosity oil to the crack which displaces air therein and reduces the discoloration. This is not entirely satisfactory, however, since the oil gradually bleeds from the crack and the discoloration reappears.

A permanent form of a repair is disclosed in Pat. 3,562,366 to Sohl, which, briefly, comprises introducing a liquid polymerizable resin into the crack with the aid of short bursts of supersonic vibrations and then causing the resin to harden. Since the vibrator produces unwanted heat which must be dissipated by a flow of water, such apparatus would appear to be somewhat expensive and also unwieldy in that portability is highly desirable so that a repair may be performed at the storage locus of a vehicle, rather than to bring the vehicle to the locus of the repair equipment. Further, certain literature accompanying apparatus of such type admonishes against attempts to repair cone breaks with emanating cracks, apparently because such emanating cracks would tend to enlarge when subjected to supersonic vibration. Additionally, the crack filling operation is obscured from view of the operator unless the vibrator is removed and the crack examined from the rear face of the windshield.

In the event such examination should reveal incomplete filling of the crack, it would then be necessary to reapply the vibrator and continue the operation until examination revealed complete filling. As will be apparent, examination for complete filling is essential before the polymer is hardened since, after hardening, it would be impossible to cause liquid to displace any air trapped by the hardened material.

SUMMARY OF THE INVENTION

The present invention bears some similarity to the Sohl disclosure referred to in that a reservoir containing polymerizable liquid is disposed adjacent the damaged area of the windshield and a probe is employed to apply pressure to the apex of the cone which has separated from the pane by a surrounding conical crack. It differs in that the central plastic lamination of the windshield may be heated to slightly soften it to permit the glass cone to more readily move slightly within the surrounding crack and pressure is also applied to the apex of the cone in a gyratory manner around the axis of the cone which gyrates it, progressively widening the crack circumferentially thereof. The gyratory movement of the cone facilitates entry of the liquid into the crack to displace the air therein. During this operation, no vibration is applied to the windshield, as in the Sohl patent, which could lengthen small cracks radiating from the conical crack. The reservoir, moreover, is of no fixed form, as in the Sohl patent, but is made of putty or modeling clay and "tailored" to the particular damaged area and to the particular slope of the windshield. Also, the reservoir is open at the top so that the filling of the crack may be observed, as indicated by the change of discoloration of the damaged area. When no discoloration is observed the operator is ensured that the conical crack and emanating cracks, if any, have been completely filled with liquid. An electric light bulb disposed behind the crack not only provides heat to soften the central lamination but provides illumination to better observe the crack-filling operation.

DETAILED DESCRIPTION OF PREFERRED EMBODIMENTS

Figure 1:
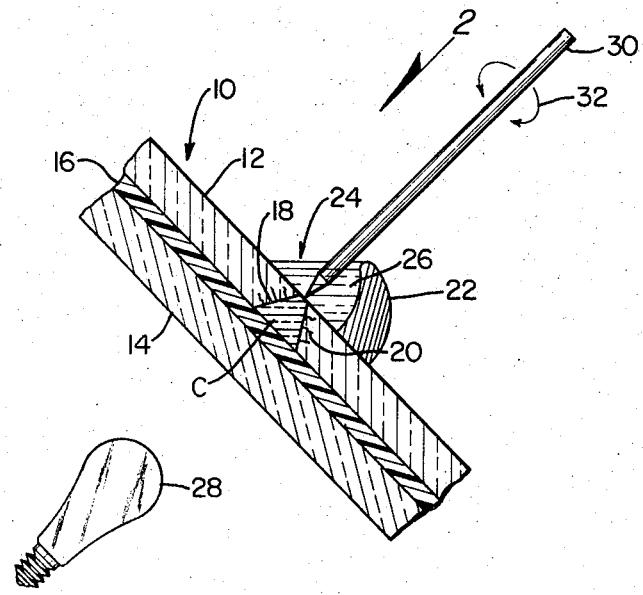
FIG. 1 is a vertical section through a windshield illustrating apparatus employed in the repair of a crack therein.

Referring now to the drawing, windshield 10 comprises the conventional outer glass pane 12, inner glass pane 14 and intermediate polybutyral lamination 16 adhered therebetween which renders the windshield shatter resistant. It will be assumed that pane 12 has been impacted by a small hard object which has produced a slight indentation in its outer surface and forming a generally conical crack 18, which extends to the surface of lamination 16. Also, small cracks 20 may radiate outwardly from the conical crack. As will be understood, conical crack 18 and radiating cracks 20, if any, will contain air which renders the damaged area visible.

In the preferred process of rendering the damaged area invisible, or substantially so, a generally semi-circular dam 22 of putty, modeling clay or the like, is formed around the damaged locus to provide a liquid reservoir 24 for containing liquid 26 which may be oil, a pre-polymer polymerizable by actinic radiation, or other suitable liquid. An incandescent light bulb 28 (75 w.) is preferably disposed about half an inch from the rear pane 14 and energized to raise the temperature of the lamination to about 110–135° F., at which temperature it becomes somewhat more pliable, permitting the cone of glass C to move slightly within its surrounding conical crack. Although it is preferred to heat the rear pane 14 during the process, this is not essential to the success of the process. As will be understood, the base of the glass cone remains adhered to lamination 16. Liquid 26 is then introduced into reservoir 24 to provide a liquid level high enough to permit liquid to enter the highest point of crack 18 or emanating cracks 20, if any.

A pointed tool 30, such as a machinist's scriber or an awl, is next applied to the tip of glass cone C and pressure applied thereto in a direction normal to the surface of the windshield for about 15 seconds. While maintaining pressure, the tool is then gyrated in a circular orbit as indicated by arrow 32 for about another 15 seconds. This tilts glass cone C slightly in all directions about its base permitting the liquid to more readily flow into all parts of the crack and displace the air therein. In the event any air remains, which may be visually observed because of refraction, the pressure technique just described may be repeated until the damaged area is invisible. In most instances, however, a single application of the pressure technique will suffice. Heat applied by light bulb 28 may now be discontinued. If the liquid is a pre-polymer polymerizable by actinic radiation it is now polymerized by exposure to actinic radiation. This may be done with excess pre-polymer in the dam or it may be removed first. If the liquid is oil and the opening in the glass to the outside is sealed with a polymerizable resin, this resin is now polymerized. After hardening of the resin, the dam is removed, the excess solid material on the outer face of the windshield is sheared away and the material within the small indentation is polished to conform with the surrounding area, thus completing the repair.

In the preferred form of the invention the liquid is preferably a polyester resin mixture which hardens in the presence of actinic radiation which polymerizes it. Those resins which, when mixed with methyl methacrylate to yield a clear, liquid polymerizable resin with a viscosity of between 3 and 50 centipoises at 70° F. are preferred and particularly compositions containing 5 to 7 parts by weight of polyester and 3 to 5 parts by weight of methyl methacrylate, having a viscosity of between 5 and 20 centipoises at 70° F. Styrene may be substituted for a minor portion of the methyl methacrylate if desired. This mixture contains a catalyst, such as benzoyl peroxide, in concentrations of 0.1 to 1.0 percent. The mixtures also contain a coupling agent, such as methacrylic acid ester of hydroxypropyltrimethoxy silane, for improving bonding to the glass. The mixtures also contain benzoin in concentrations of .1 to 1.0 percent. As will be understood, a particular liquid is not germane to the invention, however, it should preferably be: (1) transparent and remain so against coloration, (2) of low viscosity, (3) resistant to crazing or cracking, (4) bondable to glass, and (5) a pre-polymer polymerizable in the presence of actinic radiation from a source including sunlight or a lamp designed for producing this type radiation.

Examples of compositions found to be successful are:

EXAMPLE 1

| Material | Parts by weight |
| --- | --- |
| Liquid polyester resin | 6 |
| Methyl methacrylate | 4 |
| Benzoyl peroxide | 0.03 |
| Organosilane | 0.025 |
| Benzoin | 0.02 |

EXAMPLE 2

| Material | Parts by weight |
| --- | --- |
| Liquid polyester resin | 5 |
| Methyl methacrylate | 5 |
| Benzoyl peroxide | 0.03 |
| Organosilane | 0.025 |
| Benzoin | 0.02 |

The liquid polyester resin is a combination of maleic anhydride, o-phthalic anhydride, propylene glycol and styrene exhibiting a Brookfield viscosity of about 350 centipoises at 25° C. Such a resin is Clear Casting Resin Type 5938, obtainable from the Stepan Chemical Company, Anaheim, Calif.

The types of compositions disclosed in the Sohl patent are illustrative of others which may be used.

Figures 2, 3:
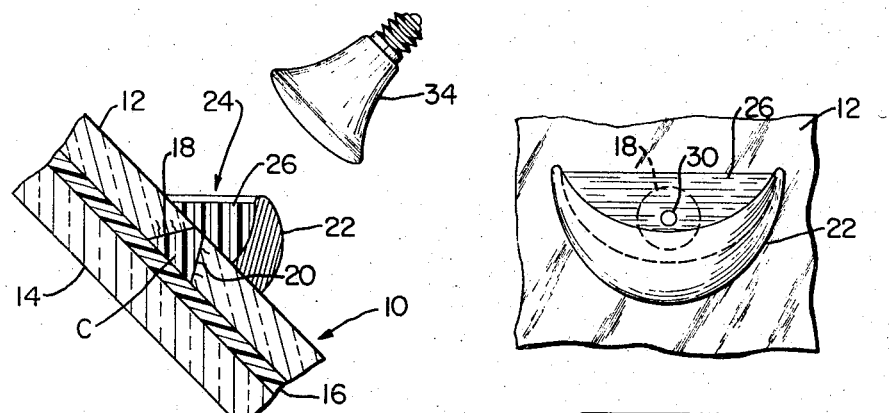
FIG. 2 is an elevation as viewed in the direction of arrow 2, FIG. 1.
FIG. 3 is a section like FIG. 1 illustrating curing of the repair.

The curing conditions of the liquid resin may vary somewhat depending upon the type of resin employed, whether the repair is being made indoors or outdoors and amount of catalyst and photosensitizer present. Liquid resin formulations which will harden within 60 minutes at 65° F. in sunlight or when exposed indoors to a 250 watt General Electric sunlamp placed 15 inches from the windshield will be found satisfactory for most repairs. FIG. 3 illustrates such a sunlamp 34 employed for indoor curing.

While the liquid resin repair so far described is generally preferred, there may be instances where, for reasons of economy of cost of reduction of time for a repair, a repair may be desired which may be made without the curing step. In an alternative process the dam is filled with a transparent liquid such as Johnson's Baby Oil and Cone C is pressurized and gyrated as previously described until the oil displaces all air in the conical crack and emanating cracks, if any. The dam is then removed and the windshield is cleaned in the locus of the small indentation with a solvent, such as hexane, to remove oil remaining in the indentation. A fast-setting clear epoxy resin is then applied to the indentation and allowed to set. After setting, excess hardened resin is sheared off with a razor blade flush with the surrounding surface of the glass and polished with metal polish if so desired. Such resins are readily available and are often marketed in two collapsible tubes, their ingredients being mixed, usually in equal volumes, just prior to application. While the introduction of a mineral oil to cracks in glass has long been performed, as previously alluded to, this process differs in several respects. Firstly, the broken cone C is manually manipulated by pressure along its axis and in a gyratory manner about its axis to facilitate displacement of air, and secondly, the small indentation at the apex of the cone is plugged to prevent bleeding of the liquid from the crack or cracks. Additionally, the lamination may be softened slightly by heat to facilitate gyration of the cone and the liquid in the reservoir is maintained at a level to permit liquid to enter the highest point of the crack.

What is claimed is:

1. A method of repairing a windshield disposed in upright position, the windshield being of the type having front and rear glass panels secured together by an intermediate plastic lamination, the front panel having a crack of generally conical form with air therein, the apex of the cone being adjacent the exposed surface of the front panel and the base of the cone being disposed adjacent the lamination, the apex also forming a small indentation in the front panel, comprising the steps of:

(a) applying a dam of pliable moldable material to the front panel to form a liquid reservoir with an open top and adapted to have a liquid level therein to permit the liquid to flow into the highest point of the crack and through which open top and liquid within the reservoir the crack may be observed, (b) filling said reservoir to said level with a relatively low viscosity liquid pre-polymer polymerizable by actinic radiation to form a transparent polymer product, (c) applying pressure with a hand-held pointed probe to the apex of the cone in a direction normal to its base, applying like pressure angularly to its base in all angular positions therearound and continuously changing directions to thereby cause the cone to gyrate within its surrounding crack, (d) observing the cracked locus through the liquid in the reservoir until the cracked locus is invisible, and (e) applying actinic radiaiton to the locus of the crack until the pre-polymer polymerizes and hardens.

2. The method of claim 1 in which heat is applied to the rear panel in the locus of the base of the cone to soften the lamination adjacent thereto.

3. A method in accordance with claim 2 wherein heat is applied to the panel with a light source also providing illumination for better observing the filling of the crack.

4. A method in accordance with claim 2 wherein the lamination is heated to about 110° to 135° F.

5. Apparatus for repairing a windshield disposed in upright position, the windshield being of the type having front and rear glass panels secured together by an intermediate lamination, the front panel having a crack of generally conical form with air therein, the apex of the cone being adjacent the exposed surface of the front panel and the base of the cone being disposed adjacent the lamination, the apex also forming a small indentation in the front panel, comprising:

(a) a dam of pliable material, such as putty, modeling clay, or the like, applied to the front panel forming a liquid reservoir with an open top adapted to have a liquid level therein at about the highest point of the crack and through which open top and liquid within the reservoir the crack may be observed, (b) a relatively low viscosity liquid pre-polymer polymerizable to a transparent polymer product by actinic radiation filling said reservoir to said level, (c) a hand-held pointed probe for applying pressure to the apex of the cone in a direction normal to its base and for applying like pressure angularly to its base in an angular position therearound and continuously changing directions to thereby cause the cone to gyrate within its surrounding crack, (d) the construction being such that the cracked locus may be observed through the liquid in the reservior until the cracked locus is invisible, and (e) a source of actinic radiation for applying same to the locus of the crack until the pro-polymer polymerizes and hardens.

6. Apparatus in accordance with claim 5 including a heat source for applying heat to the rear panel of the windshield in the locus of the base of the cone to soften the lamination adjacent thereto.

7. Apparatus in accordance with claim 6 wherein the heat source is an electric light bulb which also provides illumination for better observing the filling of the crack.

8. Apparatus in accordance with claim 7 wherein the light bulb is of such wattage and such disstance behind the windshield to heat the lamination to about 110° to 135° F.

References Cited
UNITED STATES PATENTS

| | | | |
|---|---|---|---|
| 3,562,366 | 2/1971 | Sohl | 264—36 X |
| 3,765,975 | 10/1973 | Sohl | 156—94 |

EDWARD G. WHITBY, Primary Examiner

U.S. Cl. X.R.

117—2; 118—506; 156—293, 390; 264—36